(12) United States Patent
Ogawa et al.

(10) Patent No.: US 10,461,662 B1
(45) Date of Patent: Oct. 29, 2019

(54) AC/DC CONVERTER

(71) Applicants:Kabushiki Kaisha Toshiba, Minato-ku, Tokyo (JP); Toshiba Electronic Devices & Storage Corporation, Minato-ku, Tokyo (JP)

(72) Inventors: Toshiyuki Ogawa, Kawasaki Kanagawa (JP); Fumi Moritsuka, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/289,764

(22) Filed: Mar. 1, 2019

(30) Foreign Application Priority Data

Sep. 19, 2018 (JP) ................... 2018-174518

(51) Int. Cl.
*H02M 7/219* (2006.01)
*H02M 7/217* (2006.01)

(52) U.S. Cl.
CPC ................... *H02M 7/2173* (2013.01)

(58) Field of Classification Search
CPC ............ H02M 7/02; H02M 7/04; H02M 7/21; H02M 7/217; H02M 7/2173; H02M 7/219; H02M 2001/0022
See application file for complete search history.

(56) References Cited

U.S. PATENT DOCUMENTS

2011/0242860 A1* 10/2011 Takizawa ............. H01L 23/645
 363/62
2014/0347904 A1* 11/2014 Kinoshita ............. H02M 7/217
 363/126
2016/0204713 A1* 7/2016 Dwari ................... H02M 7/217
 363/89

FOREIGN PATENT DOCUMENTS

| JP | 2009-100505 A | 5/2009 |
| JP | 5455055 B2 | 3/2014 |
| JP | 5769764 B2 | 8/2015 |
| JP | 6017272 B2 | 10/2016 |

* cited by examiner

*Primary Examiner* — Gary L Laxton
(74) *Attorney, Agent, or Firm* — White & Case LLP

(57) ABSTRACT

According to one embodiment, an AC/DC converter includes a switching element that responds to a drive signal. The drive signal is generated from a three-level PWM signal that is generated from a two-level PWM signal generated from a voltage of an AC power supply and a reference signal. When a polarity of the voltage of the AC power supply is inverted, the AC/DC converter generates the drive signal by using a two-level PW signal obtained by inverting a duty ratio of a two-level PWM signal during a period just before an inversion of the polarity of the voltage of the AC power supply.

20 Claims, 8 Drawing Sheets

FIG.4

|  | PULSE WIDTH | |
| --- | --- | --- |
|  | D>0.5 | D≤0.5 |
| PWM2 | (1-D)/2 | 0 |
| PWM1 | 1 | D×2 |

AC/DC CONVERTER

CROSS-REFERENCE TO RELATED APPLICATIONS

This application is based upon and claims the benefit of priority from Japanese Patent Application No. 2018-174518, filed on Sep. 19, 2018; the entire contents of which are incorporated herein by reference.

FIELD

The embodiment described herein relates generally to an AC/DC converter.

BACKGROUND

Conventionally, there has been disclosed a technology in which capacitors are serially connected between output terminals of an Alternating-Current/Direct-Current (AC/DC) converter, which converts the voltage of an AC power supply into a DC voltage and operates its control by generating a middle-level output voltage, so as to improve the power factor of the AC/DC converter. The AC/DC converter has a configuration for stepping up or stepping down the output voltage by using a current flowing into a boost inductor. When a polarity of the voltage of the AC power supply is inverted, a direction of the current flowing into the boost inductor is changed, and thus there has been desired an AC/DC converter that is appropriately controlled in accordance with the inversion of the polarity of the voltage.

BRIEF DESCRIPTION OF THE DRAWINGS

FIG. 4 is a diagram illustrating examples of a pulse width of a three-level PWM signal;

DETAILED DESCRIPTION

In general, according to one embodiment, an Alternating-Current/Direct-Current (AC/DC) converter includes a first input terminal that is connected to one input side of an AC power supply; and a second input terminal that is connected to another input side of the AC power supply. The AC/DC converter includes a first output terminal and a second output terminal. The AC/DC converter includes a first capacitor that is connected to the first output terminal and an interposed connection terminal therebetween; and a second capacitor that is connected to the interposed connection terminal and the second output terminal therebetween. The AC/DC converter includes a first diode that is connected to the first input terminal and the first output terminal therebetween so that a forward direction of the first diode is a direction from the first input terminal toward the first output terminal; and a second diode that is connected to the second output terminal and the first input terminal therebetween so that a forward direction of the second diode is a direction from the second output terminal toward the first input terminal. The AC/DC converter includes a first switching element that is connected to the first output terminal and the second input terminal therebetween; a second switching element that is connected to the second input terminal and the second output terminal therebetween; and third and fourth switching elements whose main current paths are serially connected between the second input terminal and the interposed connection terminal. The AC/DC converter includes a first PWM-signal generating circuit that generates a two-level PWM signal in accordance with a comparison result between a voltage of the AC power supply and a predetermined reference signal. The AC/DC converter includes a second PWM-signal generating circuit that generates a three-level PWM signal from an output signal of the first PWM-signal generating circuit. The AC/DC converter includes a drive-signal generating circuit that generates, from an output signal output from the second PWM-signal generating circuit, drive signals to be supplied to the first to the fourth switching elements. The AC/DC converter includes a detection circuit that detects a polarity of the voltage of the AC power supply. When the detection circuit detects an. inversion of a polarity of the voltage of the AC power supply, the AC/DC converter supplies, to the second PWM-signal generating circuit, a two-level PWM signal that is obtained by inverting a duty ratio of a two-level PWM signal output from the first PWM-signal generating circuit during a period just before the inversion of the polarity of the voltage of the AC power supply.

Exemplary embodiment of an AC/DC converter will be explained below in detail with reference to the accompanying drawings. The present disclosure is not limited to the following embodiment.

First Embodiment

Figure 1:
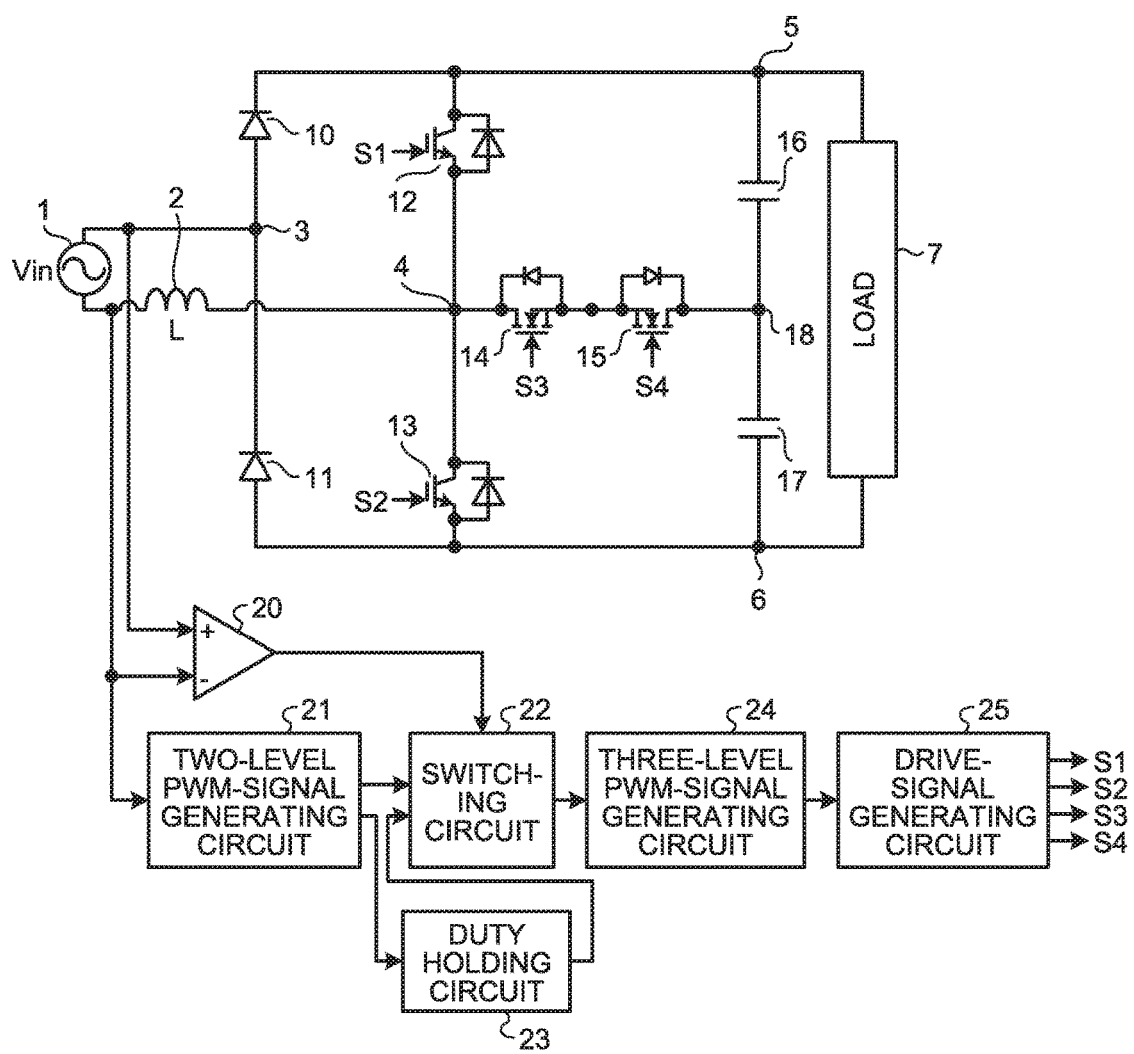
FIG. 1 is a diagram illustrating an Alternating-Current/Direct-Current (AC/DC) converter according to a first embodiment.

FIG. 1 is a diagram illustrating an AC/DC converter according to a first embodiment. The AC/DC converter according to the present embodiment includes an input terminal 3 to which an AC power supply 1 is applied, and an input terminal 4 that is connected to the AC power supply 1 via a boost inductor 2. A diode 10 is connected to the input terminal 3 and an output terminal 5 therebetween in a forward. direction from the input terminal 3 toward the output terminal 5. A diode 11 is connected to an output terminal 6 and the input terminal 3 therebetween in a forward direction from the output terminal 6 toward the input terminal 3.

An emitter-collector path is connected to the input terminal 4 and the output terminal 5 therebetween, which is a main current path of an N-channel Insulated Gate Bipolar Transistor (IGBT) 12. An emitter-collector path is connected to the input terminal 4 and the output terminal 6 therebetween, which is a main current path of an N-channel IGBT 13. Withstand voltages of the N-channel IGBTs 12 and 13 are 600V, for example.

Source-drain paths are serially connected between the input terminal 4 and an interposed connection terminal 18, which. are main current paths of N-channel Metal-Oxide Semiconductor (MOS) transistors 14 and 15. Withstand voltages of the N-channel MOS transistors 14 and 15 are 300V, for example. Hereinafter, the N-channel IGBTs 12 and 13 and the N-channel MOS transistors 14 and 15 may be collectively referred to as "switching elements".

A capacitor 16 is connected to the interposed connection terminal 18 and the output terminal 5 therebetween. A capacitor 17 is connected to the interposed connection terminal 18 and the output terminal 6 therebetween. Capacities of the capacitors 16 and 17 are set to the same value. An output voltage between the output terminals 5 and 6 is supplied to a load 7.

The AC/DC converter according to the present embodiment includes a polarity detecting circuit 20 that detects a change in a polarity of a voltage Vin of the AC power supply 1. The polarity detecting circuit 20 compares voltages (voltage Vin) of both ends of the AC power supply 1 with each other, for example, when a voltage applied to a non-inversion input end (+) of the polarity detecting circuit 20 is higher than a voltage applied to an inversion input end (−), outputs a signal indicating an H level. In other words, the polarity detecting circuit 20 executes a zero-crossing detection.

The AC/DC converter includes a two-level Pulse-Width-Modulation-signal (PWM-signal) generating circuit 21. The two-level PWM-signal generating circuit 21 compares the voltage Vin of the AC power supply 1 with a predetermined reference signal (for example, triangular-wave signal), and generates a two-level PWM signal having a duty ratio D according to a comparison result so as to output the generated two-level PWM signal.

The output signal, which is output from the two-level PWM-signal generating circuit 21, is supplied to a switching circuit 22 and a duty holding circuit 23. The duty holding circuit 23 stores therein the duty ratio D of the two-level PWM signal output from the two-level PWM-signal generating circuit 21. The duty holding circuit 23 generates a two-level PWM signal having a duty ratio /D, which is obtained by inverting the duty ratio D of the two-level PWM signal output from the two-level PWM-signal generating circuit 21, for example, so as to output the generated two-level PWM signal. The duty ratio D held by the duty holding circuit 23 may be sequentially updated in accordance with the two-level PWM signal output from the two-level PWM-signal generating circuit 21.

The switching circuit 22 switches between the two-level PWM signal, which is output from the two-level PWM-signal generating circuit 21, and the two-level PWM signal, which is output from the duty holding circuit 23, in accordance with a detection signal of the polarity detecting circuit 20, so as to output the switched signal. For example, when an inversion is detected in a polarity of the voltage Vin of the AC power supply 1, the switching circuit 22 supplies the two-level PWM-signal, which is output from the duty holding circuit 23, to a three-level PWM-signal generating circuit 24. In other words, a two-level PWM signal, which is obtained by inverting a duty ratio of a two-level PWM signal output from the two-level PWM-signal generating circuit 21 just before inversion of a polarity of the voltage Vin of the AC power supply 1, is output from the duty holding circuit 23, to be supplied to the three-level PWM-signal generating circuit 24.

The inversion of the polarity of the voltage Vin of the AC power supply 1 inverts a direction of a current that is to be supplied to the capacitors 16 and 17 via the boost inductor 2. Just after the inversion of the polarity of the voltage Vin of the AC power supply 1, a drive-signal generating circuit 25 supplies drive signals S1 to S4 to respective switching elements 12 to 15 so as to control ON/OFF of the switching elements 12 to 15. Just after the inversion of the polarity of the voltage Vin of the AC power supply 1, the drive signals S1 to S4 are generated from the signal obtained by inverting the duty ratio D of the two-level PWM signal that is output, just before the polarity of the voltage Vin of the AC power supply 1 is inverted, from the two-level PWM-signal generating circuit 21.

The three-level PWM-signal generating circuit 24 generates a three-level PWM signal from the two-level PWM signal supplied from the switching circuit 22. A specific configuration of the three-level PWM-signal generating circuit 24 will be mentioned later.

The drive-signal generating circuit 25 generates, from the output signal of the three-level PWM-signal generating circuit 24, the drive signals S1 to S4 to be respectively supplied to the switching elements 12 to 15, so as to supply the generated signals to corresponding control electrodes of the switching element 12 to 15.

The AC/DC converter according to the present embodiment includes the polarity detecting circuit 20 that detects inversion of a polarity of the voltage Vin of the AC power supply 1; the three-level PWM-signal generating circuit 24 generates, just after the polarity of the voltage Vin of the AC power supply 1 is inverted, a three-level PWM signal from a signal obtained by inverting a duty ratio of a two-level PWM-signal that is output from the two-level PWM-signal generating circuit 21 just before the inversion of the polarity of the voltage Vin of the AC power supply 1; and the drive-signal generating circuit 25 generates, from an output signal of the three-level PWM-signal generating circuit 24, the drive signals S1 to S4 for controlling the switching elements 12 to 15.

The inversion of the polarity of the voltage Vin of the AC power supply 1 causes a change in a direction of a current flowing into the boost inductor 2; however, an action of the boost inductor 2 for keeping the present current state delays a change of the current. In other words, the change in a direction of an actually-flowing current is behind a change in a duty ratio that is set by comparison between the voltage Vin of the AC power supply 1 and the reference signal. Therefore, just after a polarity of the voltage Vin of the AC power supply 1 is inverted, ON/OFF of the switching elements 12 to 15 is controlled by using the signal obtained by inverting the duty ratio of the two-level PWM signal output, just before the polarity of the voltage Vin of the AC power supply 1 is inverted, from the two-level PWM-signal generating circuit 21, so as to control a current path. Thus, it is possible to perform a control according to the delay of the change of current, which is caused by the action of the boost inductor 2.

Figure 2:
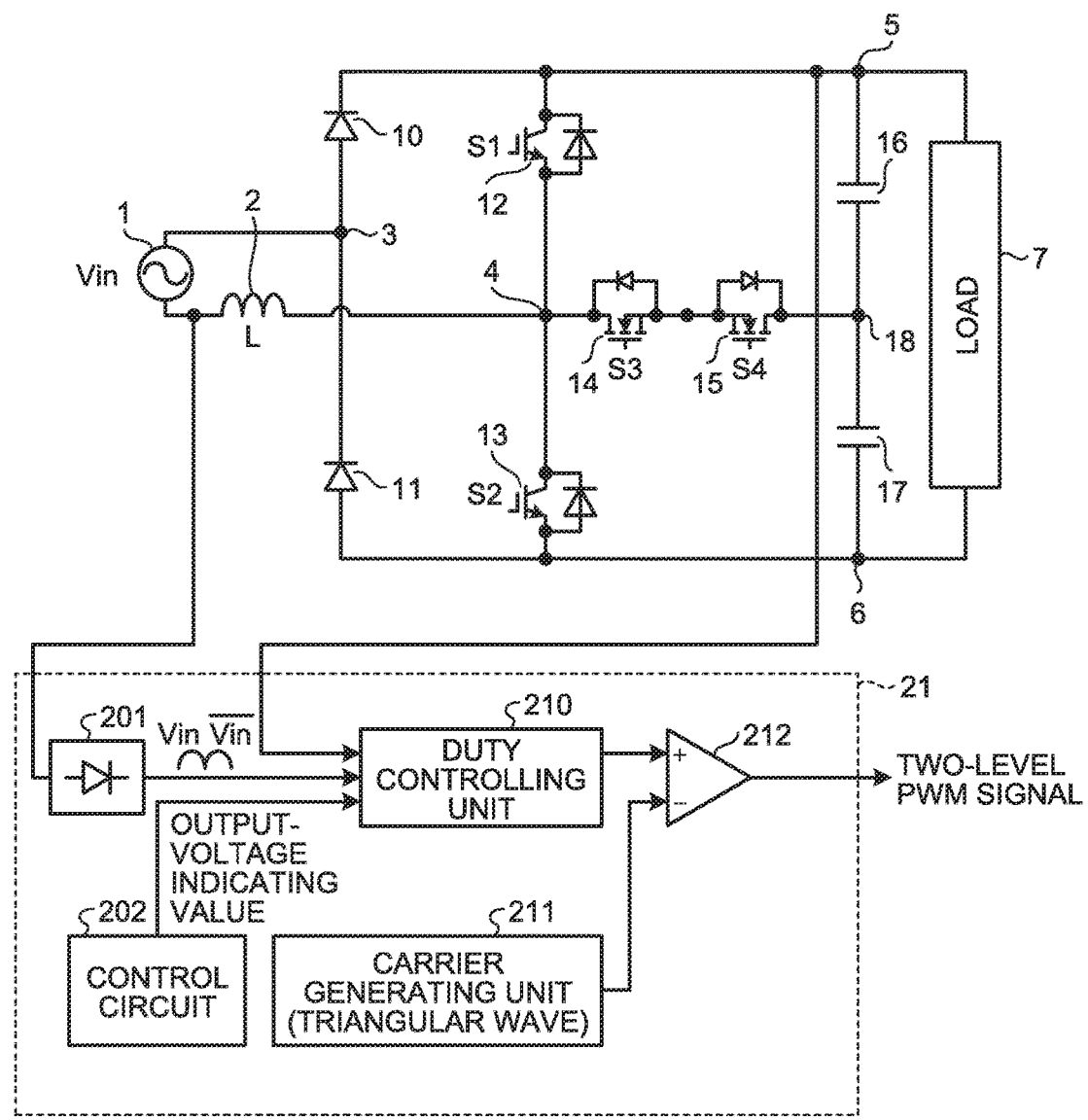
FIG. 2 is a diagram illustrating a configuration example of a two-level PWM-signal generating circuit.

FIG. 2 is a diagram illustrating a configuration example of the two-level PWM-signal generating circuit 21. Note that in the following, a part different from the above-mentioned embodiment will be mainly described, and the common parts are represented with same symbols and the description as omitted appropriately. The same applies hereinafter. In FIG. 2, the configurations of the polarity detecting circuit 20, a latter part of the two-level PWM-signal generating circuit 21, and the like that are illustrated in FIG. 1 are omitted.

The two-level PWM-signal generating circuit 21 includes a duty controlling unit 210. A voltage of the output terminal 5, a voltage obtained by full-wave rectifying the voltage Vin of the AC power supply 1 by a rectification circuit 201, and an output-voltage indicating value transmitted from a control circuit 202 are applied to the duty controlling unit 210.

The duty controlling unit 210 adjusts a level of the full-wave-rectified voltage Vin of the AC power supply 1 so that the voltage of the output terminal 5 is equal to the output-voltage indicating value transmitted from the control circuit 202, and outputs the adjusted full-wave-rectified voltage Vin of the AC power supply 1 as an output signal.

A comparison circuit 212 compares the output signal of the duty controlling unit 210 with a reference signal of a carrier generating unit 211. The carrier generating unit 211 generates the reference signal constituted of a triangular wave, for example.

The comparison circuit 212 compares a magnitude relation between the output signal of the duty controlling unit 210 and the reference signal of the carrier generating unit 211, and outputs, in accordance with the result, a ratio between an H level and an L level, in other words, a two-level PWM signal whose duty ratio changes. The two-level PWM signal is converted into a three-level PWM signal by the three-level PWM-signal generating circuit 24.

Figure 3A:
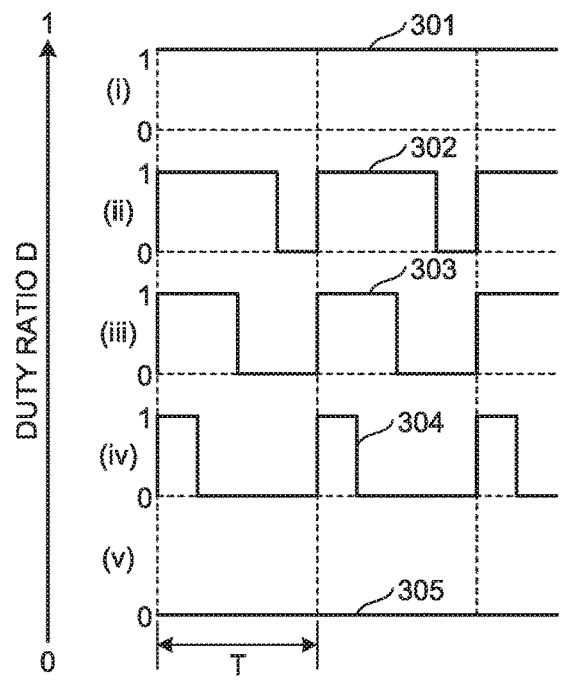
FIGS. 3A and 3B are diagrams illustrating examples of conversion of PWM signals.
Figure 3B:
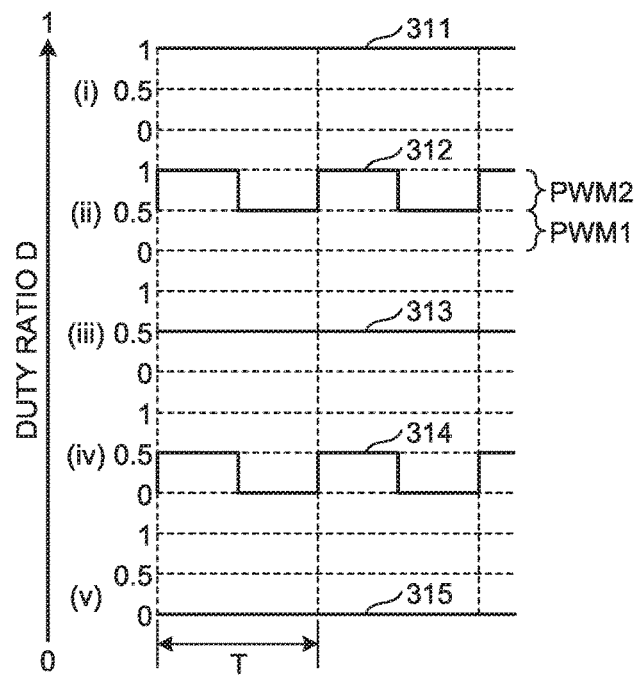

FIGS. 3A and 3B are diagrams illustrating examples of conversion from a two-level PWM signal into a three-level PWM signal. FIG. 3A is a diagram illustrating examples of two-level PWM signals output from the two-level PWM-signal generating circuit 21. The vertical axis indicates the duty ratio D. In the examples illustrated in FIG. 3A, (i) a two-level PWM signal 301 has the duty ratio D (D=1), (ii) a two-level PWM signal 302 has the duty ratio D (0.5<D<1), (iii) a two-level PWM signal 303 has the duty ratio D (D=0.5), (iv) a two-level PWM signal 304 has the duty ratio D (0<D<0.5), and (v) a two-level PWM signal 305 has the duty ratio D (D=0). In the two-level PWM signals 301 to 305, the ratio changes between "0"-level and "1"-level in accordance with the duty ratio D during one period T.

FIG. 3B is a diagram illustrating examples of three-level PWM signals converted into three levels. In (i) to (v) illustrated in. FIG. 3B, three-level PWM signals 311 to 315 are illustrated, which are respectively converted in accordance with the two-level PWM signals 301 to 305 illustrated in (i) to of FIG. 3A. The three-level PWM signals 311 to 315 are constituted of a PWM output signal PWM1 whose ratio between H-level and L-level changes, during the one period T, between levels "0" and "0.5", and a PWM output signal PWM2 whose ratio between H-level and L-level changes, during the one period T, between levels "1" and "0.5".

For example, the two-level PWM signal 301 whose duty ratio D is "1", which is illustrated in (i) of FIG. 3A, is converted into the three-level PWM signal 311 that keeps a level "1" illustrated in (i) of FIG. 3B. Similarly, the two-level PWM signal 302 whose duty ratio D is "0.5<D<1", which is illustrated in (ii) of FIG. 3A, is converted into the PWM output signal PWM1 that keeps a level "0.5" and the PWM output signal PWM2 whose ratio between H-level and L-level changes between a level "0.5" and a level "1", which are illustrated in (ii) of FIG. 3B.

Figure 4:
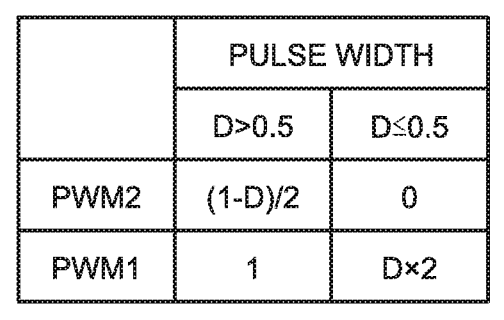

FIG. 4 is a diagram illustrating examples of a pulse width of the three-level PWM signal, which is corresponding to the duty ratio D of the two-level PWM signal. When the duty ratio D of the two-level PWM signal satisfies "D>0.5", the PWM output signal PWM1 of the three-level PWM signal keeps a level "1". In other words, the PWM output signal PWM1 having a level "0.5" keeps an H level during one period of the PWM signal. The PWM output signal PWM2 of the three-level PWM signal keeps an H level of a level "1" during a time interval of "(1−D)/2".

When the duty ratio D of the two-level PWM signal satisfies "D≤0.5", the PWM output signal PWM2 of the three-level PWM signal keeps a level "0". In other words, the PWM output signal PWM2 having a level "1" keeps an L level during one period of the PWM signal. The PWM output signal PWM1 of the three-level PWM signal having a level "0.5" keeps an H level during a time interval of "D×2".

The three-level PWM-signal generating circuit 24 converts the two-level PWM signal into the three-level PWM signal so as to output the converted three-level PWM signal.

Figure 5A:
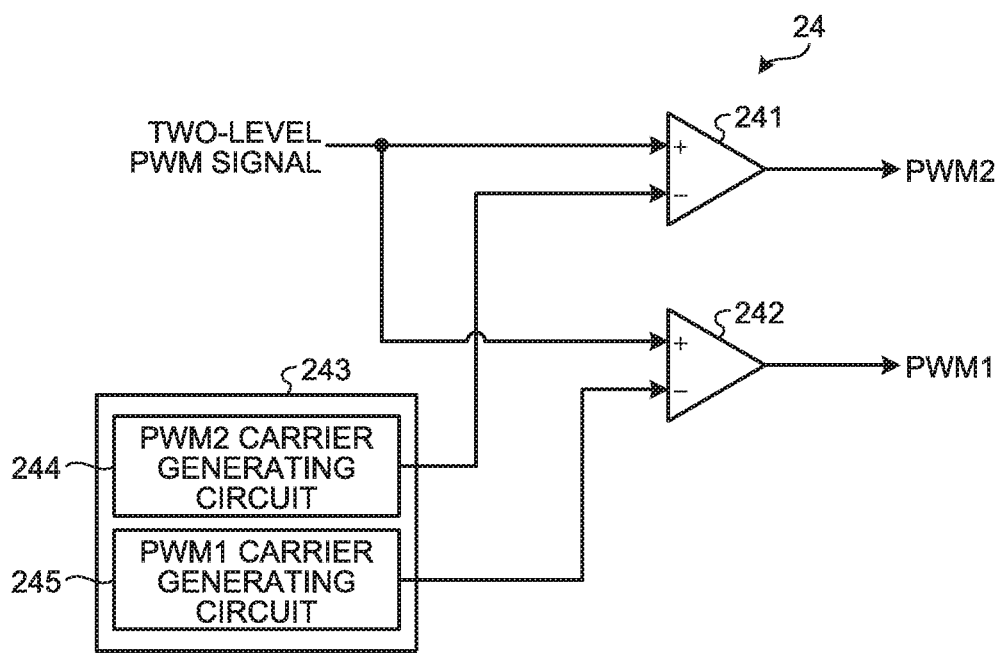
FIGS. 5A and 5B are diagrams illustrating configuration examples of a three-level PWM-signal generating circuit.
Figure 5B:
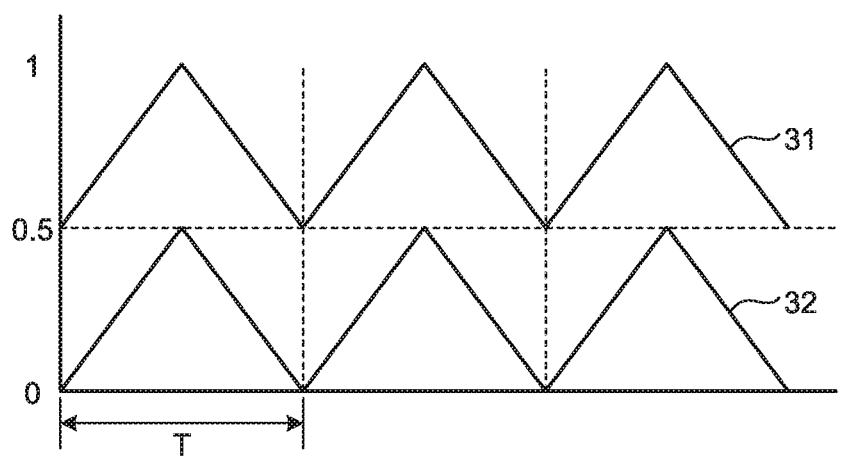

FIGS. 5A and 5B are diagrams illustrating configuration examples of the three-level PWM-signal generating circuit 24. The three-level PWM-signal generating circuit 24 illustrated in FIG. 5A includes comparison circuits 241 and 242 to each of whose non-inversion input ends (+) the two-level PWM signal is supplied.

The three-level PWM-signal generating circuit 24 includes a carrier generating circuit 243 that outputs a reference signal. The carrier generating circuit 243 includes a PWM1-carrier generating circuit 245 that outputs a PWM1 carrier for generating the PWM output signal PWM1, and a PWM2-carrier generating circuit 244 that outputs a PWM2 carrier for generating the PWM output signal PWM2.

The comparison circuit 241 outputs the PWM output signal PWM2 in accordance with a comparison result between a two-level PWM signal and a PWM2 carrier transmitted from the PWM2-carrier generating circuit 244.

The comparison circuit 242 outputs the PWM output signal PWM1 in accordance with a comparison result between the two-level PWM signal and a PWM1 carrier transmitted from the PWM1-carrier generating circuit 245.

FIG. 5B is a diagram illustrating examples of the PWM2 carrier and the PWM1 carrier that are output from the PW2-carrier generating circuit 244 and the PWM1-carrier generating circuit 245. The PWM1-carrier generating circuit 245 outputs a PWM1 carrier 32 constituted of a triangular wave formed between a level "0" and a level "0.5". The PW2-carrier generating circuit 244 outputs a PWM2 carrier 31 constituted of a triangular wave formed between a level "0.5" and a level "1".

For example, when the duty ratio D of the two-level PWM signal is larger than 0.5, the PWM output signal PWM1, which is output from the comparison circuit 242 in accordance with a comparison result between the two-level PWM signal and the PWM1 carrier 32, becomes an H level during the one period T of the PWM1 carrier 32 corresponding to one period of the two-level PWM signal. The comparison circuit 241 outputs the PWM output signal PWM2 for which a ratio between an H level and an L level is set in accordance with a comparison result between the PWM2 carrier 31 and the two-level PWM signal.

Figure 6A:
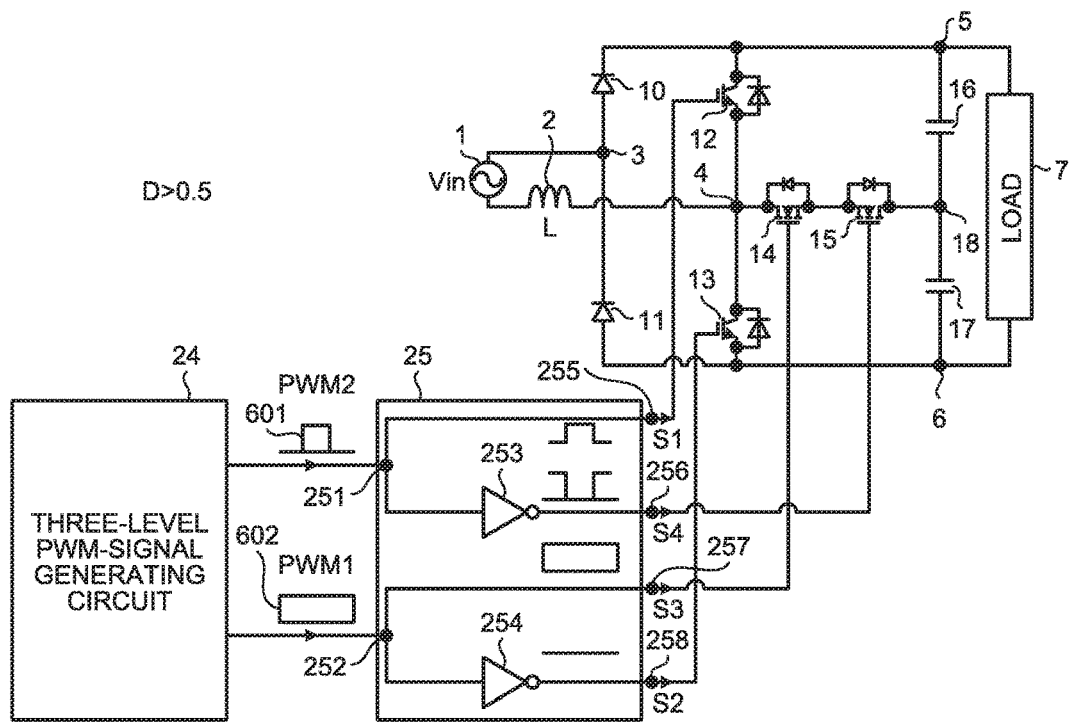
FIGS. 6A and. 6B are diagrams illustrating examples of methods for supplying drive signals.
Figure 6B:
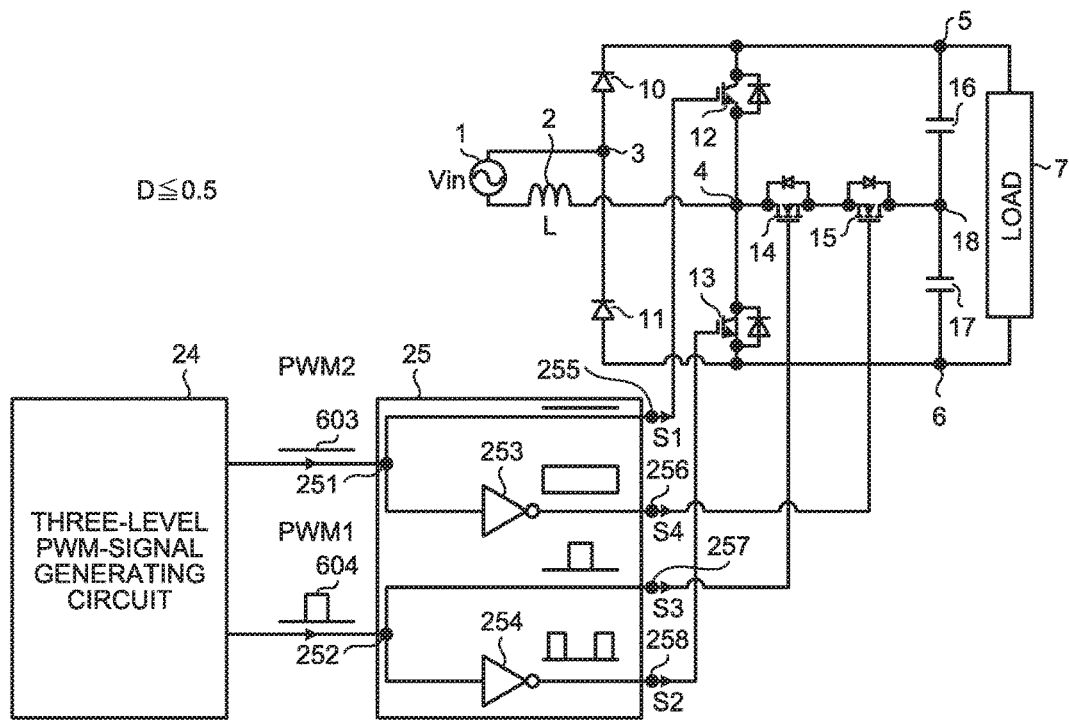

FIGS. 6A and 6B are diagrams illustrating examples of methods for supplying the drive signals S1 to S4. FIG. 6A is a diagram illustrating a case where the duty ratio D of the two-level PWM signal is larger than "0.5". The PWM output signals PWM1 and PWM2 of the three-level PWM-signal generating circuit 24 are supplied to the drive-signal generating circuit 25.

The drive-signal generating circuit 25 includes input ends 251 and 252 to which output signals transmitted from the three-level PWM-signal generating circuit 24 are supplied. The drive-signal generating circuit 25 includes an output end 255 that outputs, as the drive signal S1, the PWM output signal PWM2 supplied to the input end 251 as it is, and an output end 256 that outputs, as the drive signal S4, the PWM output signal PWM2 supplied to the input end 251 via an inverter 253. The drive-signal generating circuit 25 includes an output end 257 that outputs, as the drive signal S3, the PWM output signal PWM1 supplied to the input end 252 as it is, and an output end 258 that outputs, as the drive signal S2, the PWM output signal PWM1 supplied to the input end 252 via an inverter 254.

The drive signal S1 of the output end 255 is supplied to a gate of the IGBT 12. The drive signal S4 of the output end 256 is supplied to a gate of the MOS transistor 15. The drive signal S3 of the output end 257 is supplied to a gate of the MOS transistor 14. The drive signal S2 of the output end 258 is supplied to a gate of the IGBT 13. Conductive states of the switching elements 12 to 15 are controlled by respectively using the drive signals S1 to S4 of the drive-signal generating circuit 25.

As described above, when the duty ratio D of the two-level PWM signal is larger than "0.5", the PWM output signal PWM1 that is illustrated in FIG. 6A by using a reference symbol "602" keeps an H level, thus the drive signal S3 becomes an H level, and the MOS transistor 14 turns into an ON state. The IGBT 13, to which the drive signal S2 being an inversion signal of the PWM output signal PWM1 is supplied, turns into an OFF state. The IGBT 12 for which a ratio between an H level and an L level is set in accordance with the duty ratio D of the two-level PWM signal and to which the PWM output signal PWM2, which is illustrated in FIG. 6A by using a reference symbol "601", is supplied as the drive signal S1 as it is turns into an ON state when the PWM output signal PWM2 is an H level. On the other hand, the MOS transistor 15, to which a signal obtained by inverting the PWM output signal PWM2 is supplied as the drive signal S4, turns into an ON state when the PWM output signal PWM2 is an L level.

FIG. 6B is a diagram illustrating a case where the duty ratio D of the two-level PWM signal is equal to or less than "0.5". As described above, when the duty ratio D of the two-level PWM signal is equal to or less than "0.5", the PWM output signal PWM2, which is illustrated in FIG. 6B by using a reference symbol "603", keeps an L level, and thus the IGBT 12 turns into an OFF state. The MOS transistor 15, to which the inversion signal of the PWM output signal PWM2 is supplied as the drive signal S4, turns into an ON state. The MOS transistor 14, to which the PWM output signal PWM1 is supplied as the drive signal S3 as it is turns into an ON state when the PWM output signal PWM1 is an H level. A ratio between an H level and an L level of the PWM output signal PWM1 is set in accordance with the duty ratio D of the two-level PWM signal illustrated in FIG. 6B by using a reference symbol "604". On the other hand, the IGBT 13 to which a signal obtained by inverting the PWM output signal PWM1 is supplied as the drive signal S2 turns into an ON state when the PWM output signal PWM1 is an L level.

Figure 7A:
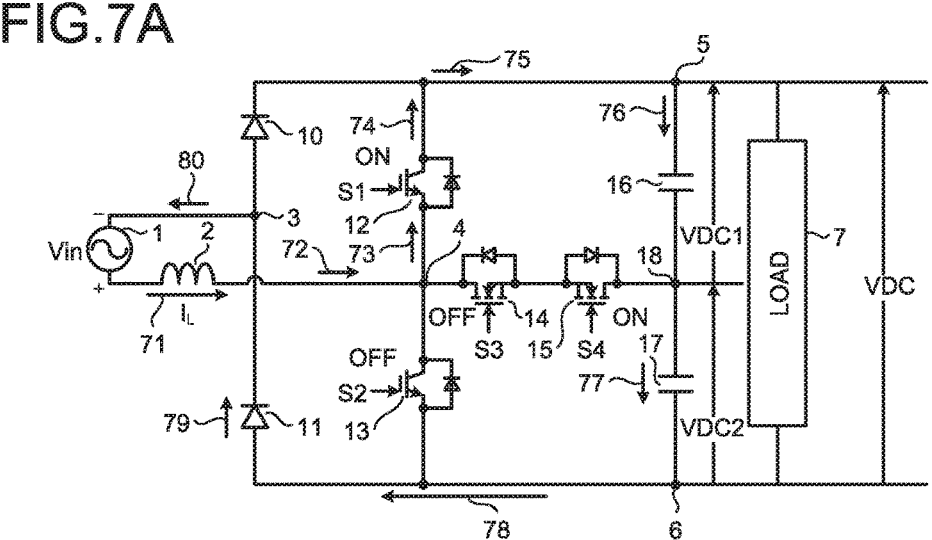
FIGS. 7A to 7C are diagrams illustrating control patterns of switching elements and corresponding flows of a current.
Figure 7B:
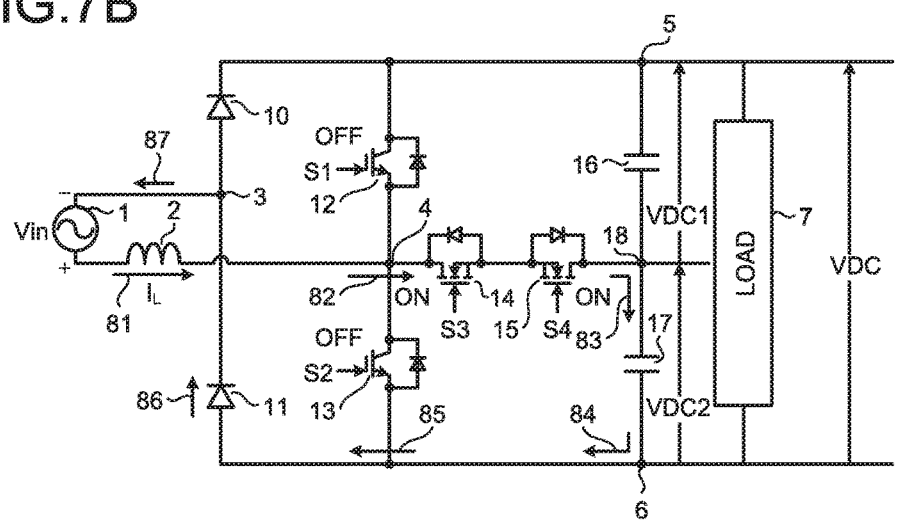
Figure 7C:
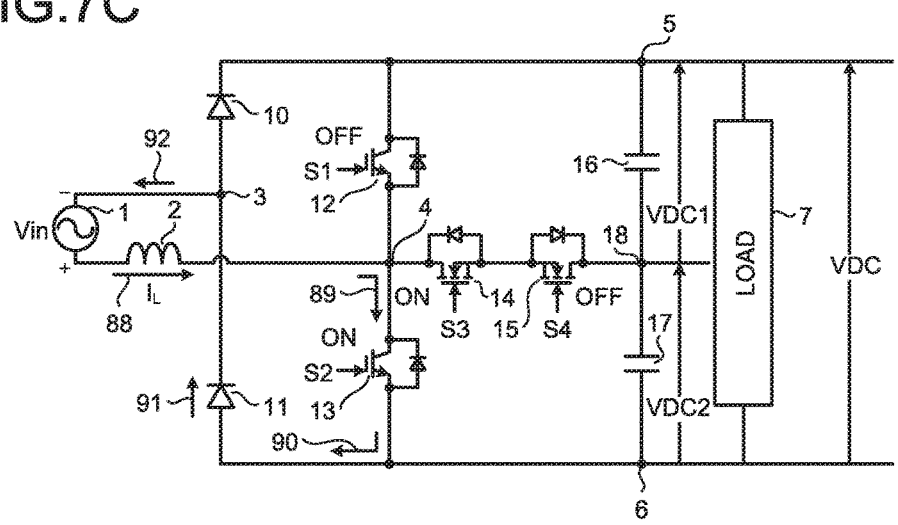

FIGS. 7A to 7C are diagrams illustrating control patterns of the switching elements 12 to 15 and corresponding flows of current $I_L$. In FIGS. 7A to 7C, a case is illustrated in which an electric potential on a side of the boost inductor 2 of the AC power supply 1 has a positive polarity. In FIG. 7A, a case is illustrated in which the IGBT 12 is turned ON and the IGBT 13 is turned OFF. In this state, the current $I_L$ flows through a route indicated by using arrows 71 to 80 so as to charge both of the capacitors 16 and 17. When capacities of the capacitors 16 and 17 are the same, a DC voltage VDC1 between both ends of the capacitor 16 and a DC voltage VDC2 between both ends of the capacitor 17 are equal to each other. Thus, a voltage of the interposed connection terminal 18 becomes a voltage that is one-half of a voltage VDC between the output terminals 5 and 6.

In FIG. 7B, a case is illustrated in which the IGBTs 12 and 13 are turned OFF. In this state, the current $I_L$ flows through a route indicated by using arrows 81 to 87 so as to charge only the capacitor 17 that is connected to the interposed connection terminal 18 and the output terminal 6 therebetween. In this case, a voltage of the input terminal 4 is equal to a voltage of the interposed connection terminal 18.

In FIG. 7C, a case is illustrated in which the IGBT 12 and the MOS transistor 15 are turned OFF. In this state, the current $I_L$ flows through a route indicated by using arrows 88 to 92. In the state, the capacitors 16 and 17 are not charged. The three states illustrated in FIGS. 7A to 7C are controlled by using the drive signals S1 to S4 that are to be respectively applied to the switching elements 12 to 15, so that it is possible to obtain the desired DC voltage VDC between the output terminals 5 and 6.

The state illustrated in FIG. 7B, namely, the state in which the voltage of the input terminal 4 becomes the voltage of the interposed connection terminal 18, in other words, a middle voltage of the output voltage between the output terminals 5 and 6 is provided, so that it is possible to control a transition from the state illustrated in FIG. 7A to that illustrated in FIG. 7B, and a transition from the state illustrated in FIG. 7B to that illustrated in FIG. 7C, while keeping the voltage between the emitter and the collector of each of the IGBTs 12 and 13 low. Furthermore, ON/OFF of the IGBTs 12 and 13 is able to be controlled in a state where the voltage between the emitter and the collector of each of the IGBTs 12 and 13 is low, it is possible to suppress an occurrence of a noise caused by the ON/OFF of the IGBTs 12 and 13.

When a polarity of the voltage Vin of the AC power supply 1 is inverted, a direction of the current $I_L$ flowing through the boost inductor 2 is inverted. Thus, a relation between charge and discharge of each of the capacitors 16 and 17 is reversed. As described above, when detecting an inversion of the polarity of the voltage Vin of the AC power supply 1, the AC/DC converter according to the present embodiment has inverts the duty ratio D of the two-level PWM signal output from the two-level PWM-signal generating circuit 21, in other words, a ratio between an H level and an L level; and generates the three-level PWM signal so as to generate the drive signals S1 to S4, so that it is possible to operate its control in accordance with a delay of a change in the current, which is due to an action of the boost inductor 2 just after the polarity of the voltage Vin of the AC power supply 1 has inverted.

Figure 8:
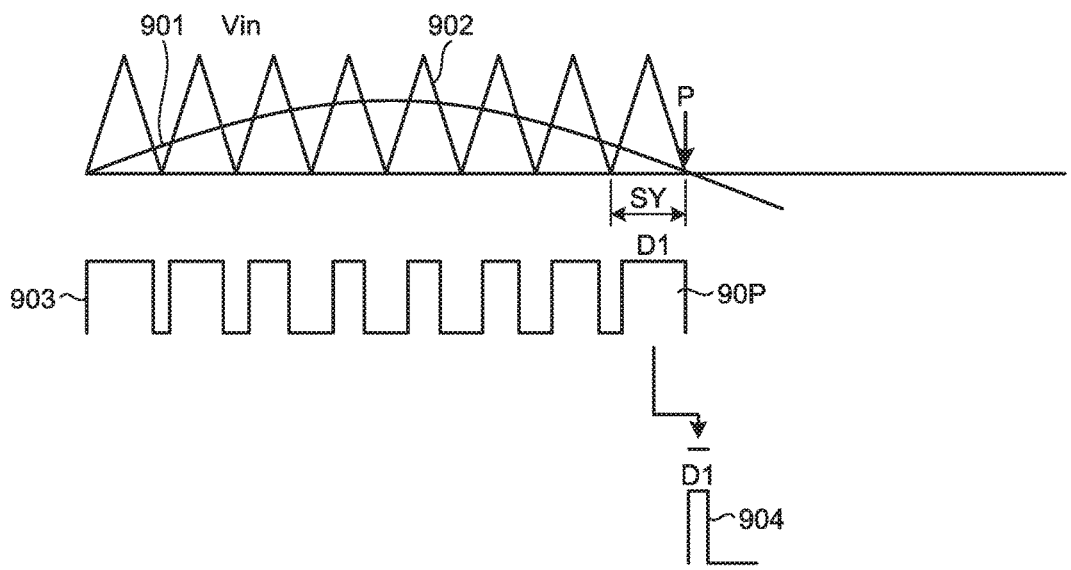
FIG. 8 is a diagram illustrating a conversion of a duty ratio when an inversion of a voltage polarity of an AC power supply is detected.

FIG. 8 is a diagram illustrating a conversion of the duty ratio D when an inversion of a polarity of the voltage Vin of the AC power supply 1 is detected. A two-level PWM signal 903 is output by comparison between a signal 901 indicating the voltage Vin of the AC power supply 1 and a triangular-wave carrier signal 902.

At a point P when a polarity of the voltage Vin of the AC power supply 1 is inverted, a two-level PWM signal 904 is generated, which has a duty /D1 obtained by inverting a duty ratio D1 of a two-level PWM signal 90P that is output during a period SY just before the point P at which the polarity of the voltage Vin of the AC power supply 1 is inverted, namely, one period of the two-level PWM signal just before the point P; the drive signals S1 to S4 as well as the three-level PWM signal are further generated by the above-mentioned configuration; and they are supplied to the switching elements 12 to 15.

The two-level PWM signal supplied from the two-level PWM-signal generating circuit 21 may be used as the two-level PWM signal to be supplied, subsequently to the duty ratio /D1 just after the inversion of the polarity of the voltage Vin of the AC power supply 1, to the three-level PWM-signal generating circuit 24. In other words, in the embodiment illustrated in FIG. 1, the two-level PWM signal generated in the duty holding circuit 23 via the switching circuit 22 may be supplied to the three-level PWM-signal generating circuit 24 just after a polarity of the voltage Vin of the AC power supply 1 is inverted, thereafter, the switching circuit 22 may be controlled so as to sequentially supply two-level PWM output signals of the two-level PWM-signal generating circuit 21 to the three-level PWM-signal generating circuit 24.

Figure 9:
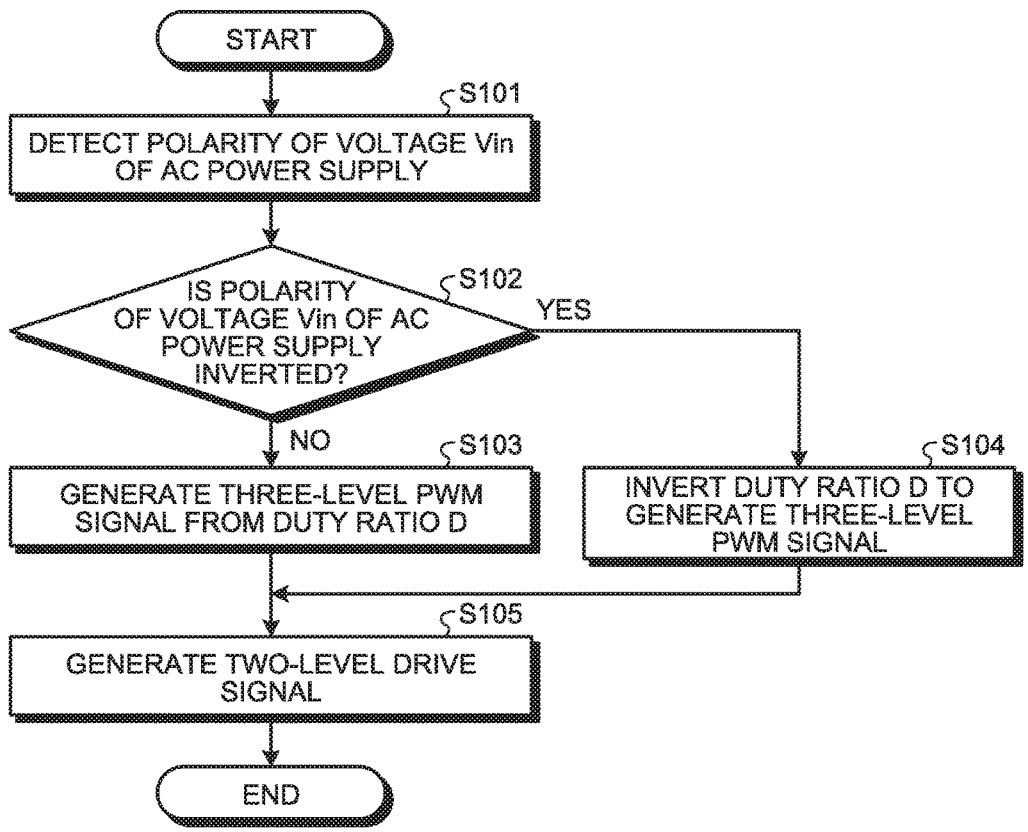
FIG. 9 is a flowchart illustrating a procedure for converting a duty ratio according to one embodiment.

FIG. 9 is a flowchart illustrating a procedure for converting the duty ratio D. A polarity of the voltage Vin of the AC power supply 1 is detected (Step S101). When the polarity of the voltage Vin of the AC power supply 1 is inverted (Step S102: Yes), the duty ratio D of the two-level PWM signal is inverted to generate a three-level PWM signal (Step S104). In other words, a two-level PWM signal obtained by inverting the duty ratio D of the two-level PWM signal, which is output from the two-level PWM-signal generating circuit 21 during a period just before the polarity of the voltage Vin of the AC power supply 1 is inverted, is generated by the duty holding circuit 23; and a three-level PWM signal is generated from the generated two-level PWM signal.

When there presents no inversion of the polarity of the voltage Vin of the AC power supply 1 (Step S102: No), a three-level PWM signal is generated from the duty ratio D of the two-level PWM signal that is output from the two-level PWM-signal generating circuit 21 (Step S103). The two-level drive Signals S1 to S4 are generated from the generated three-level PWM signal (Step S105). As described above, the generated two-level drive signals S1 to S4 are respectively supplied to the controlling electrodes of the switching elements 12 to 15.

While certain embodiments have been described, these embodiments have been presented by way of example only, and are not intended to the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. Alternating-Current/Direct-Current (AC/DC) converter comprising:
   a first input terminal that is connected to one input side of an AC power supply;
   a second input terminal that is connected to another input side of the AC power supply;
   a first output terminal;
   a second output terminal;
   a first capacitor that is connected to the first output terminal and an interposed connection terminal therebetween;
   a second capacitor that is connected to the interposed connection terminal and the second output terminal therebetween;
   a first diode that is connected to the first input terminal and the first output terminal therebetween so that a forward direction of the first diode is a direct on from the first input terminal toward the first output terminal;
   a second diode that is connected to the second output terminal and the first input terminal therebetween so that a forward direction of the second diode is a direction from the second output terminal toward the first input terminal;
   a first switching element that is connected to the first output terminal and the second input terminal therebetween;
   a second switching element that is connected to the second input terminal and the second output terminal therebetween;
   third and fourth switching elements whose main current paths are serially connected between the second input terminal and the interposed connection terminal;
   a first PWM-signal generating circuit that generates a two-level PWM signal in accordance with a comparison result between a voltage of the AC power supply and a predetermined reference signal;
   a second PWM-signal generating circuit that generates a three-level PWM signal from an output signal of the first PWM-signal generating circuit;
   a drive-signal generating circuit that generates, from an output signal output from the second PWM-signal generating circuit, drive signals to be supplied to the first to the fourth switching elements; and
   a detection circuit that detects a polarity of the voltage of the AC power supply, wherein
   when the detection circuit detects an inversion of a polarity of the voltage of the AC power supply, a two-level PWM signal, which is obtained by inverting a duty ratio of a two-level PWM signal output from the first PWM-signal generating circuit during a period just before the inversion of the polarity of the voltage of the AC power supply, is supplied to the second PWM-signal generating circuit.

2. The AC/DC converter according to claim 1, further comprising:
   a holding circuit that holds a duty ratio of the two-level PWM signal output from the first PWM-signal generating circuit.

3. The AC/DC converter according to claim 2, wherein the holding circuit outputs a two-level PWM signal having a duty ratio that is obtained by inverting a duty ratio of a two-level PWM signal output from the first PWM-signal generating circuit.

4. The AC/DC converter according to claim 3, further comprising:
   a switching circuit to which outputs of the first PWM-signal generating circuit and the holding circuit are input, and that switches, in accordance with an output signal of the detection circuit, between the outputs of the first PWM-signal generating circuit and the holding circuit so as to supply a switched output to the second PWM-signal generating circuit.

5. The AC/DC converter according to claim 1, wherein the second PWM-signal generating circuit generates, in accordance with the two-level PWM signal of the first PWM-signal generating circuit, a first PWM output signal whose ratio between L-level and H-level changes between levels "0" and "0.5" and a second PWM output signal whose ratio between L-level and H-level changes between levels "0.5" and "1".

6. The AC/DC converter according to claim 5, wherein when a value of "D" that is a duty ratio of the two-level PWM signal output from the first PWM-signal generating circuit exceeds "0.5", the second PWM-signal generating circuit generates the first PWM output signal that keeps the level "0.5" during one period and the second PWM output signal whose level is "1" during a time interval obtained by multiplying the one period by "(1−D)/2".

7. The AC/DC converter according to claim 5, wherein the drive-signal generating circuit includes:
a first input end to which the first PWM output signal is suppled;
a first output end that outputs the first PWM output signal;
a second output end that outputs an inversion signal of the first PWM output signal;
a second input end to which the second PWM output signal is supplied;
a third output end that outputs the second PWM output signal; and
a fourth output end that outputs an inversion signal of the second PWM output signal.

8. The AC/DC converter according to claim 7, wherein the drive-signal generating circuit is configured to:
supply an output of the first output end to the third switching element;
supply an output of the second output end to the second switching element;
supply an output of the third output end to the first switching element; and
supply an output of the fourth output end to the fourth switching element.

9. The AC/DC converter according to claim 1, wherein
the first and the second switching elements include an insulated gate bipolar transistor, and
the third and the fourth switching elements include a metal-oxide semiconductor transistor.

10. The AC/DC converter according to claim 1, wherein the first PWM-signal generating circuit includes:
a control circuit that adjusts, in accordance with a voltage of the first output terminal and an indicating value that indicates a set value of an output voltage, a level of an output signal that is based on an voltage of the AC power supply, so as to output the output signal according to the adjusted level; and
a comparison circuit that compares the output signal of the control circuit and the predetermined reference signal with each other.

11. The AC/DC converter according to claim 5, wherein the second PWM-signal generating circuit includes:
a first comparison circuit that compares an output signal of the first PWM-signal generating circuit and a triangular-wave first reference signal formed between levels "0" and "0.5" with each other so as to output the first PWM output signal; and
a second comparison circuit that compares an output signal of the first PWM-signal generating circuit and a second reference signal formed between levels "0.5" and "1" with each other so as to output the second PWM output signal.

12. The AC/DC converter according to claim 1, further comprising:
a boost inductor arranged between the first input terminal and the second input terminal, the boost inductor being connected to the AC power supply.

13. The AC/DC converter according to claim 1, wherein the polarity detecting circuit includes a comparison circuit to which voltages of both ends of the AC power supply are input.

14. An AC/DC converter comprising:
a first input terminal that is connected to one input side of an AC power supply;
a second input terminal that is connected to another input side of the AC power supply;
a first output terminal;
a second output terminal;
a first capacitor that is connected to the first output terminal and an interposed connection terminal therebetween;
a second capacitor that is connected to the interposed connection terminal and the second output terminal therebetween;
first diode that is connected to the first input terminal and the first output terminal therebetween so that a forward direction of the first diode is a direction from the first input terminal toward the first output terminal;
a second diode that is connected to the second output terminal and the first input terminal therebetween so that a forward direction of the second diode is a direction from the second output terminal toward the first input terminal;
a first switching element that is connected to the first output terminal and the second input terminal therebetween;
a second switching element that is connected to the second input terminal and the second output terminal therebetween;
third and fourth switching elements whose main current paths are serially connected between the second input terminal and the interposed connection terminal;
a first PWM-signal generating circuit that generates a two-level PWM signal an accordance with a comparison result between a voltage of the AC power supply and a predetermined reference signal;
a holding circuit that holds a duty ratio of the two-level PWM signal output from the first PWM-signal generating circuit, and outputs a two-level PWM signal having a duty ratio obtained by inverting the duty ratio of the two-level PWM signal output from the first PWM signal generating circuit;
a detection circuit that detects a polarity of the voltage of the AC power supply;
a switching circuit to which outputs of the first PWM-signal generating circuit and the holding circuit are output, and that switches, in accordance with an output signal of the detection circuit, between the outputs of the first PWM-signal generating circuit and the holding circuit so as to supply a switched output to the second PWM-signal generating circuit;
a second PWM-signal generating circuit that generates a three-level PWM signal from an output signal of the switching circuit; and
a drive-signal generating circuit that generates, from an output signal output from the second PWM-signal generating circuit, drive signals to be supplied to the first to the fourth switching elements.

15. The AC/DC converter according to claim 14, wherein the switching circuit supplies, in response to an output of the detection circuit indicating an inversion of a polarity of the voltage of the AC power supply, a two-level PWM signal output from the holding circuit, which is obtained by inverting a duty ratio of a two-level PWM signal output from the first PWM-signal generating circuit during a period just before the inversion of the polarity of the voltage of the AC power supply, to the second PWM-signal generating circuit.

16. The AC/DC converter according to claim 14, further comprising:

a boost inductor that is arranged between the first input terminal and the second input terminal, the boost inductor being connected to the AC power supply.

17. The AC/DC converter according to claim 16, wherein the second PWM-signal generating circuit generates, in accordance with the two-level PWM signal of the first PWM-signal generating circuit, a first PWM output signal whose ratio between L-level and H-level changes between levels "0" and "0.5" and a second PWM output signal whose ratio between L-level and H-level changes between levels "0.5" and "1".

18. The AC/DC converter according to claim 17, wherein when a value of "D" that is a duty ratio of the two-level PWM signal output from the first PWM-signal generating circuit exceeds "0.5", the second PWM-signal generating circuit generates the first PWM output signal that keeps the level "0.5" during one period and the second PWM output signal whose level is "1" during a time interval obtained by multiplying the one period by "(1−D)/2".

19. The AC/DC converter according to claim 18, wherein the drive-signal generating circuit includes:

a first input end to which the first PWM output signal is supplied;
a first output end that outputs the first PWM output signal;
a second output end that outputs an inversion signal of the first PWM output signal;
a second input end to which the second PWM output signal is supplied;
a third output end that outputs the second PWM output signal; and
a fourth output end that outputs an inversion signal of the second PWM output signal.

20. The AC/DC converter according to claim 19, wherein the drive-signal generating circuit is configured to:

supply an output from the first output end to the third switching element;
supply an output from the second output end to the second switching element;
supply an output from the third output end to the first switching element; and
supply an output from the fourth output end to the fourth switching element.

* * * * *